INVENTOR:
PAUL E. TITUS
BY: *[signature]*
HIS AGENT

3,481,713
RECOVERING SOLIDS FROM OIL SLURRIES
Paul E. Titus, Houston, Tex., assignor to Shell Oil Company, New York, N.Y., a corporation of Delaware
Filed July 31, 1967, Ser. No. 657,004
Int. Cl. B01d 11/02; B01j 17/00
U.S. Cl. 23—300                                    4 Claims

ABSTRACT OF THE DISCLOSURE

A method of recovering water-soluble particles from an oil slurry by contacting the oil slurry with an aqueous solution saturated with an electrolyte under laminar flow conditions.

---

This invention relates to an improved method for recovery of water-soluble solids such as inorganic minerals from an oil slurry. More particularly, the present invention is directed to recovery of water-soluble inorganic salts from hydrocarbon oils in which said salts are dispersed therein as a slurry and which on recovery the salts are essentially free of oil and the oil free of salts.

BACKGROUND OF THE INVENTION

Water-soluble solids can be conveniently and economically transported over great distances through pipelines as oil slurries, which slurries can contain from 1–50% or more of solid material dispersed in a suitable liquid hydrocarbon carrier such as crude oil and fractions thereof ranging in viscosity from light petroleum fractions in the kerosene boiling range to high viscous oils approaching the viscosity of a crude oil. The water-soluble solids are dispersed by suitable means and may have a particle size ranging from less than 50 microns to above 5000 microns and generally are in the range of from 75 to 3000 and preferably are betwen 300 and 1500 microns.

Various techniques have been proposed for recovery of water-soluble solids such as alkali metal salts or various alkali compounds, e.g., potassium chloride, potash, potash salts, sodium chloride, muriate of potash (sylvite), soda ash, sodium sulfate, phosphate rock and the like, as well as various fertilizer material from a liquid hydrocarbon carrier, such as by settling, or precipitation, or phase transfer and the like, which methods are described in co-pending applications Ser. No. 366,870, filed May 12, 1964 and which issued as U.S. Patent 3,365,279 on Jan. 23, 1968 or Ser. No. 465,445, filed June 21, 1965 and which issued as U.S. Patent 3,368,876 on Feb. 13, 1968.

Settling or precipitation techniques, however, have drawbacks such as poor separation; they are time consuming and the separated products contain impurities which must be removed before either the solids or liquid can be considered as acceptable recovered products. Thus, using settling or precipitation techniques to recover solids such as sylvite from oil, the process is time consuming and ineffective in producing pure products of acceptable standards. The use of phase transfer techniques normally results in an emulsion interface which inhibits effective recovery of the solids and also results in products which contain substantial amounts of oil which are trapped in the water-soluble solids and presents a costly purification problem.

It is an object of the present invention to effectively separate and recover essentially oil-free water-soluble solids from an oil slurry.

Still another object of the present invention is to prepare an oil slurry containing a substantial amount of water-soluble solids dispersed therein for pipeline transportation and recovery of oil-free water-soluble solids at the terminal end of the pipeline by a novel phase transfer technique.

Still another object of the present invention is to prepare an oil slurry containing a water-soluble solid such as an inorganic salt and thereafter recovering the salt by phase transfer so that the salt is essentially free of oil and the oil free of the salt.

These and other objects will be apparent from the following description of the invention.

SUMMARY OF THE INVENTION

The present invention presents an improved technique for recovery of dispersed or suspended water-soluble solid materials from an oil slurry by contacting said oil slurry with an essentially saturated electrolytic aqueous solution under turbulent free, steady laminar flow conditions thereby effecting efficient phase transfer of the water-soluble materials from the oil phase into the aqueous phase without encountering any of the problems mentioned above and recovering oil-free water-soluble solid materials from the aqueous phase by suitable means such as by thickening, settling, filtration, centrifuging or the like. When the two fluids are contacted under laminar flow conditions, the oil phase is drawn out into long thin filaments, thus exposing large surface area for phase transfer of the salt between the oil and aqueous phases. However, because the flow is turbulent free, the formation of droplets and hence the formation of an oil-water emulsion stabilized by fine particles at the interface of the two fluids is avoided and a clean and effective transfer of the water-soluble solids from the oil phase to the aqueous phase is affected. Not only is effective separation of the water-soluble solids from the oil into the aqueous phase efficiently accomplished by contacting said fluids under laminar flow conditions, but the particle size of the solids are not diminished due to attrition to unacceptable small particle size due to tubulent flow conditions encountered in conventional recovery of the solids from an oil slurry. Also, the use of demulsifiers normally used to break or prevent the formation of an interface emulsion can be avoided when using the process of the present invention thereby making it both more economical and more efficient.

The water-soluble solid particle-oil slurry such as a slurry of sylvite-crude oil, can contain from 1% to 50% or more precent (and preferably from 20 to 40% v.) of the solid particles (50–5000 microns, preferably between 300 and 1500 microns) suspended or dispersed in the oil and the slurry can be prepared by any suitable means. The slurry normally acts as a non-Newtonian fluid and is stable for transportation through pipelines over long distances.

The saturated electrolytic aqueous fluid used in the process of the present invention can be a saturated water-solution containing an inorganic electrolyte such as alkali metal chlorides, nitrates, sulfates and the like and mixtures thereof of which preferred is a saturated brine.

DESCRIPTION OF THE PREFERRED EMBODIMENTS

According to the invention, an oil slurry containing water-soluble solid particles is brought into intimate laminar flow or smooth steady flow contact with a saturated brine, thereby causing the transfer of the solid material from the oil slurry to the brine phase; the latter phase is hereafter separated from the oil, e.g., by settling or centrifuging or other suitable means and finally the solids are recovered from the brine. The laminar flow contactor is designed to cause high surface brine-slurry contact without turbulence. The length of the laminar contactor can be varied to vary with contact time. Brine is preferably admixed with the slurry steam prior to the laminar flow contactor. The two liquids are then subject to laminar flow and the water-soluble solid material is then removed from the separated brine phase by thickening, settling, centrifuging or filtration, or a combination of these.

The residual brine may, in continuous operations, be returned to the oil-contacting step for the treatment of additional oil slurry.

When the oil slurry is brought into contact with the brine under laminar flow conditions, the solids from the oil slurry pass into the brine phase and are removed therefrom after separation of the brine phase containing the solids from the oil phase. The brine may consist of water in which is dissolved the same material as that being recovered from the oil slurry, although other water-soluble solutes or electrolytes may be used. The brine is advantageously saturated so that the preferentially wetted material will not dissolve. The solid material recovered from the brine is substantially free from oil and subsequent washing is not necessary or a light wash is sufficient. The recovered solid material is readily dried by heating. The material may be reconstituted into crystals of desired size if not in proper physical form.

The oil from which the solids are separated may contain small, usually trace amounts of solid crystals or brine droplets. When they are detrimental to the oil, they may be removed by any suitable means, such as a water wash which is followed by settling, optionally after flow through a coalescing device and/or electrostatic precipitation.

The invention is not limited to the treatment of slurries which contain dispersed particles of any particular size or range of sizes. However, it is most effective when applied to particles larger than 50 microns. Typically, the particles have diameters between 50 and 3500 (300–1500) microns and sizes up to 4000 and higher may be effectively recovered. Often fine particles are deliberately added to an oil slurry formed of larger particles to hinder settling of the latter. In such case, the finest particles are not completely transferred to the brine phase and the oil is subjected to an after treatment such as washing with hot water; this may be followed by precipitation as noted above. The fine particles thus washed from the oil are in solution, forming a brine, and may therefore be added to the brine in the system. However, some or all of this solution may be discharged, as when the inventory of brine would otherwise become too large or when it contains impurities which are to be discharged.

It is desirable to cause as little oil as possible to be carried over into the brine phase. To this purpose the brine may be heated to above ambient temperature, for example, 150° to 200° F.; higher temperatures, such as 300° F., may be used but require pressurized equipment. However, heating is feasible only with certain water-soluble materials. Thus, it was found that in some instances, in which impurities were present in the oil-slurried material, contacting with hot brine resulted in the formation in the oil phase of material which is sometimes difficult to remove. When heated brine is used, it need not be saturated at the elevated temperature, it being sufficient that it be saturated at the temperature at which he material is recovered from the brine. As a specific example, brine saturated at 85° F. may be heated to 200° F. and brought into contact with the oil to reduce the amount of oil carried into the brine and thereafter settled at 85° F.

BRIEF DESCRIPTION OF THE DRAWINGS

The invention will be further described with reference to the accompanying drawing forming a part of this specification, the single view of which is a flow diagram of an illustrative embodiment.

Referring to the drawing (FIGURE 1), a slurry such as a sylvite (technical KCl) oil slurry (40–60% v.), is discharged from pipeline 1 into a laminar flow contactor 2 but prior to introducing it into laminar flow contactor 2 brine (saturated KCl) solution is introduced into line 1 via line 3 and also, optionally, makeup water from valved line 4 and/or brine from valved line 5 is introduced into brine line 3. The structure of the laminar flow contactor can be varied schematic FIGURES 2, 2a, 3, 3a, 4 and 4a which illustrate such laminar flow contactors. In laminar flow contactor 2, phase transfer of the sylvite from the oil to the brine phase occurs and the fluid mixture is conducted from line 6 into primary settler 7 wherein the sylvite-brine phase settles to the bottom of the settler 7 and is conducted via line 8 as a sylvite mud into secondary settler 9 and the oil phase is removed via line 10 into a purifier 11 such as an electrostatic desalter or precipitator. Any entrapped or entrained oil from settler 9 is removed via line 12 and allowed to join the oil in line 10 for purification in purifier 11. To aid in removal of any entrained sylvite in purifier 11, water can be introduced via line 13. Essentially sylvite free oil is removed from purifier 11 via line 14 and the water phase removed via line 15 and rejected or recycled to settler 7 and/or 9. In the case of sylvite recovery, two settlers (7 and 9) are found to be preferable since it has been found that normally about 4–6% oil is still present in the sylvite mud in settler 7 and is reduced in settler 9 to a value of less than 1% generally below 0.5% or lower. Brine from settler 9 can be introduced into line 8 or 3 via valved line 10a or 11a. The sylvite mud from settler 9 is introduced into a suitable apparatus, e.g., calender 17, via line 18, to reduce or remove wholly or in part the aqueous phase (brine) of the sylvite mud and the aqueous phase is run into line 3 via line 19. The sylvite mud can be reconstituted into desired shape or form by introducing it via line 20 into a suitable pelletizer 21 and from there if necessary into a pellet drier 22 and pellet cooler 22a from which a portion of fines and liquid are conducted into cyclone 23 via line 24 in which the fines are introduced into line 18 and the liquid discarded via line 25. The dried sylvite from pellet drier 22 can be introduced into a classifier 26 via line 27 in which the oversized particles are sent via line 28 to a crusher 29 and from there to storage via lines 29a and 30a. The desired size particles are removed from the classifier 26 via line 30 to storage. The undersized particles from classifier 26 are removed via lines 31 and 29b and mixed with sylvite mud in line 18. When necessary additional brine can be introduced in line 20 and then recovered from settler 9 via line 32.

Figure 1:
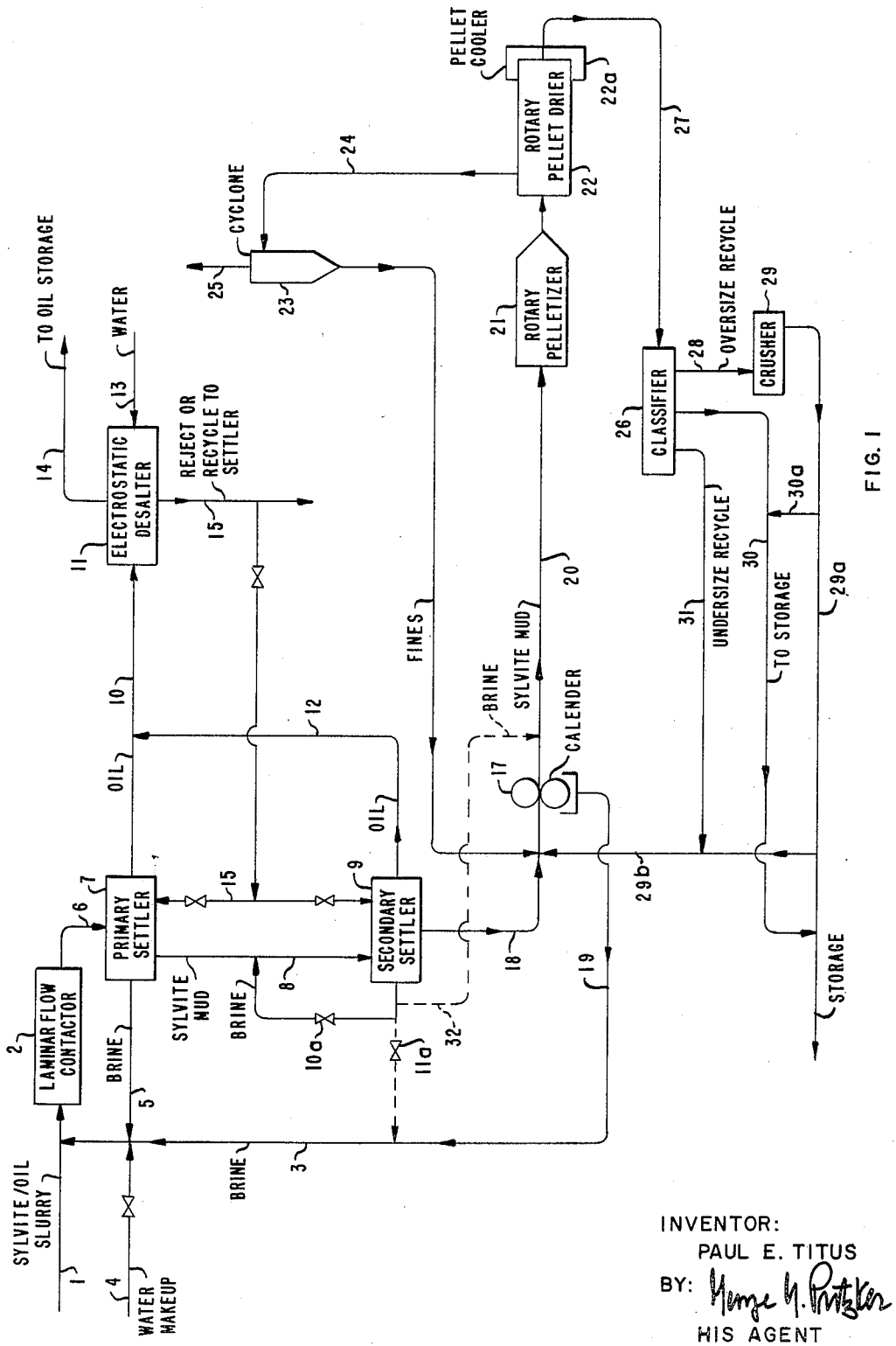
Figure 2:
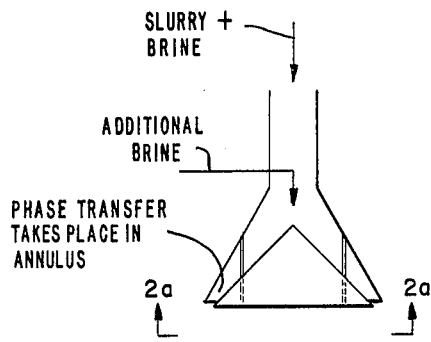
Figure 2A:
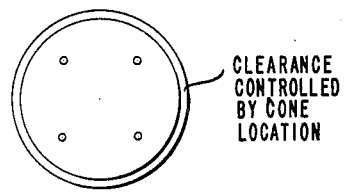
Figure 3:
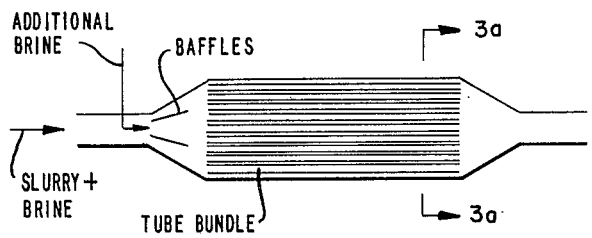
Figure 3A:
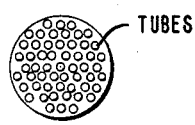
Figure 4:
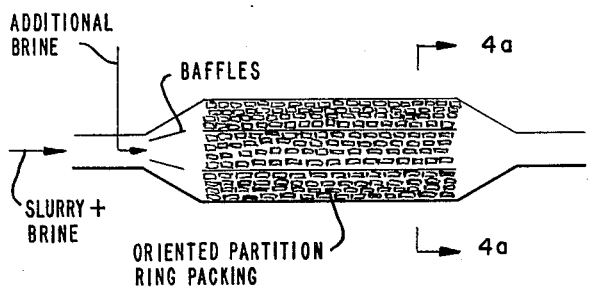
Figure 4A:

The reconstitution, drying and classifying of sylvite by the process of this invention is advantageous since in pipeline transportation of sylvite small particles are required to make a stable slurry for pumping through a pipeline. The recovered particles must be reconstituted for commercial use. This includes prilling, flaking, roll compaction, crystallization, agglomeration, etc. A preferred method is agglomeration of the mud by drying.

Moistened salts (mud) can often be agglomerated into spherical pellets on an inclined rotary drum or pan. The size of the pellets is dependent largely on the moisture content of the mud. The agglomerated mud can be dried in an oven to produce reasonably hard and strong pellets. Of the various techniques for making large particles, the agglomeration of the mud appeared to be the most desirable for use in connection with the phase transfer method of separating the slurry using laminar flow techniques of the present invention.

Thus, the sylvite mud recovered from the secondary settler 9 can be agglomerated quite readily. The mud from the settler 9 can be placed on a belt, dried and crushed to produce rough-edged agglomerates. When the mud is cast into forms, it can be recovered in most any shape and size desired. The mud can be tumbled in rotary driers to yield particles ranging from marble-like spheres to small pellets. Reconstitution of the solids into pellets (granules, modules, etc.) for fertilizer use is desirable. Pellets have inherent strength due to shape, show good dry flow characteristics (flow easily when handled by mechanical equipment), and resist segregation when mixed with other pelletized fertilizer ingredients. Furthermore, pellets allow the incorporation of other nutrients therein so as to produce a balanced fertilizer.

A pellet size of 6 to 16 U.S. mesh (3.36 mm. to 1.19 mm.) is considered satisfactory in the fertilizer industry. It has been found that forming pellets from sylvite mud of this size is a function of the moisture content of the mud. The wetter mud gave larger particles (more adherence of particles during pelletizing) and therefore brine from line 32 is introduced into the sylvite mud leaving calender 17. Sylvite mud recovered from the secondary settler 9 was found to pelletize best (for 6-16 mesh pellets) at a moisture content of about 11 to 14% w. However, other ingredients which can be subsequently added to produce balanced fertilizers will alter the system such that each particular blend has to have an optimum moisture level.

The addition of small amounts of certain salts has been found desirable to increase the hardness (resistance to attrition) of sylvite agglomerates. The added salts can be also plant nutrients and may be added in the quantities required to yield balanced fertilizers. Salts found to harden sylvite are diammonium phosphate $(NH_4)_2HPO_4$, ammonium sulfate $(NH_4)_2SO_4$, calcium phosphate $Ca_3(PO_4)_2$, ammonium nitrate $NH_4NO_3$, potassium sulfate $K_2SO_4$ and potassium phosphate $K_3PO_4$ and the like.

Tables 1-3 shows the results of tests of salt-hardened sylvite agglomerates recovered from an oil slurry by the phase transfer and laminar flow process of the present invention.

TABLE 1.—RESISTANCE TO ATTRITION OF SYLVITE AGGLOMERATES [1] HARDENED WITH SALTS

| Salt added and concentration (percent w. basis dry cake) | Sieve time, minutes | Material remaining on #12 sieve, percent w. |
|---|---|---|
| No salt added, control | 30 | 42.9 |
|  | 60 | 19.3 |
| $(NH_4)_2HPO_4$ Diammonium phosphate: |  |  |
| 0.1 | 30 | 80.8 |
| 0.1 | 60 | 65.5 |
| 0.3 | 30 | 84.0 |
| 0.3 | 60 | 78.2 |
| 30.0 | 30 | 92.3 |
| 30.1 | 60 | 85.2 |
| $(NH_4)_2SO_4$ Ammonium sulfate: |  |  |
| 0.3 | 30 | 59.1 |
| 0.3 | 60 | 35.5 |
| 1.7 | 30 | 78.8 |
| $Ca_3(PO_4)_2$ Calcium phosphate: |  |  |
| 0.3 | 30 | 58.8 |
| 1.7 | 30 | 78.1 |

[1] The agglomerates were short cylinders 2 inches in diameter and ¾ inch thick and contained about 1% w. oil. The attrition test was similar to a method used by Potash Company of America. The agglomerates were placed in a W. S. Tayler Ro-Tap sieve shaker for the indicated period of time and the amount of material retained on the sieve was measured.

TABLE 2.—RESISTANCE TO ATTRITION OF SYLVITE AGGLOMERATES [1] HARDENED WITH 1% W. SALT

Sieve Time, 30 minutes

| Salt added | Material remaining on #12 sieve, percent w. |
|---|---|
| No salt added (control) | 64.2 |
| $NH_4NO_3$ | 80.1 |
| $K_2SO_4$ | 83.0 |
| $K_3PO_4$ | 71.5 |

[1] The agglomerates were short cylinders 1½ inches in diameter and ¾ inch thick (no oil was present). The attrition test was similar to a method used by Potash Company of America. The agglomerates were placed in a W. S. Tayler Ro-Tap sieve shaker for the indicated period of time and the amount of material retained on the sieve was measured.

TABLE 3.—ATTRITION TEST [1] OF 8- to 16-MESH SYLVITE PELLETS

| | Material Retained on Sieve, Percent w. | | | |
|---|---|---|---|---|
| | 16 | 35 | 100 | −100 |
| Diammonium phosphate added, percent w.: | | | | |
| 0 | 33.8 | 32.0 | 32.0 | 2.2 |
| 0.5 | 75.5 | 14.9 | 7.4 | 2.2 |
| 1.0 | 79.6 | 13.5 | 4.9 | 2.0 |
| 3.1 | 77.4 | 17.1 | 4.3 | 1.2 |
| Sylvite crystals (8-16 mesh) | 82.6 | 15.2 | 1.4 | 0.8 |

[1] Attrition test consisted of rotating 50 grams of 8- to 16-mesh pellets and 25½ inch porcelain balls (85 grams) in a 1-liter ball mill jar for 5 minutes at 105 rpm followed by sieving.

The sylvite pellets containing the hardener compare favorably with the KCl crystal alone, not only from the standpoint of their resistance to attrition as a whole (material retained on 16-mesh sieve) but also in the amount of fines formed (material passing through the 100-mesh sieve).

The greatest effect of diammonium phosphate in increasing the hardness of sylvite agglomerates and pellets (Tables 1 and 3) was found to occur at relatively low concentrations of the salt (less than 0.5% w.). Thereafter, the addition of increasing amounts of the hardener did little to improve the hardness of the sylvite.

Other plant nutrients that may be added to sylvite mud not only to produce a balanced fertilizer but to control the physical properties include sulfur and urea. When small pellets are made, these compounds, added either separately or together to the sylvite mud, harden the subsequent pellets by the formation of a hard outer shell. This shell is obtained by the glazing of the dried pellets in a hot zone at short residence times, such that the sulfur and/or urea are fused only on the surface.

The invention is also illustrated by the following examples.

A 40% v. sylvite-in-crude oil was prepared and contacted with varying ratios of saturated brine solution under laminar flow in a laminar flow contactor made from ¼ inch pipe and the effectiveness at various laminar flow rates and brine/slurry ratios in which 0.3 gms./liter of a demulsifier (Aquaness 6902, Atlas Powder Company) was added to the brine is shown in Table 4 and without the demulsifier in Table 5.

TABLE 4.—LAMINAR FLOW CONTRACTOR EFFICIENCY AT VARIOUS REYNOLDS NUMBERS AND BRINE SLURRY RATIOS—AQUANESS DEMULSIFIER USED

1:1 Brine to Slurry Ratio

| Brine/Slurry Flow Rate | | Viscosity, cps. | Re.[1] | Effectiveness of Contractor |
|---|---|---|---|---|
| Ml./sec. | Ft./sec. | | | |
| 13.4 | 0.656 | 362 | 6.35 | Good. |
| 21.3 | 1.05 | 283 | 13.0 | Do. |

2:1 Brine to Slurry Ratio

| 8.25 | 0.404 | 273 | 5.11 | Good. |
| 10.3 | 0.505 | 269 | 6.41 | Do. |
| 12.9 | 0.633 | 201 | 10.8 | Do. |

1:2 Brine to Slurry Ratio

| 3.58 | 0.176 | 1,060 | 0.60 | Fair. |
| 5.36 | 0.263 | 741 | 1.26 | Do. |
| 8.09 | 0.396 | 493 | 2.95 | Good. |
| 10.3 | 0.505 | 386 | 4.69 | Do. |
| 12.5 | 0.604 | 323 | 6.71 | Do. |

[1] Re. (Reynolds Value) = $\frac{\pi L V^2}{D \Delta P}$ where: L = Length of contactor.
D = Pipe diameter.
V = Velocity.
ΔP = Pressure drop across the contactor.
π = Effective density of slurry-brine mixture.

TABLE 5.—LAMINAR FLOW CONTRACTOR EFFICIENCY AT VARIOUS REYNOLDS NUMBERS AND BRINE/SLURRY RATIOS NO AQUANESS DEMULSIFIER USED

1:1 Brine to Slurry Ratio

| Brine/Slurry Flow Rate | | Viscosity, cps. | Re.[1] | Effectiveness of Contactor |
|---|---|---|---|---|
| Ml./sec. | Ft./sec. | | | |
| 13.6 | 0.666 | 217 | 6.16 | Fair. |
| 18.3 | 0.897 | 189 | 16.7 | Good. |

2:1 Brine to Slurry Ratio

| | | | | |
|---|---|---|---|---|
| 13.7 | 0.671 | 114 | 20.9 | Fair. |

1:2 Brine to Slurry Ratio

| | | | | |
|---|---|---|---|---|
| 9.94 | 0.487 | 401 | 4.32 | Fair. |
| 12.9 | 0.632 | 335 | 6.76 | Do. |

[1] Re. (Reynolds Value) = $\frac{\pi L V^2}{D \Delta P}$ where: L = Length of contactor.
D = Pipe diameter.
V = Velocity.
ΔP = Pressure drop across the contactor.
π = Effective density of slurry-brine mixture.

Although the laminar flow process has been used to illustrate the recovery of sylvite, other water-soluble solids such as potash, phosphate rock, soda ash and the like slurried in oil and recovered therefrom by phase transfer from a standard brine using laminar flow contacting of the fluid mixtures as described above can be also used successfully to recover and reconstitute these products.

Other demulsifiers which can be used if desired are carboxylamides, sulfoamides and the like described in U.S. Patents 2,106,240; 2,106,241; 2,106,244; 2,733,218; 2,792,372; 3,206,412; 3,259,587 and 3,272,751.

The foregoing description of the invention is merely intended to be explanatory thereof. Various changes in the details of the method may be made, within the scope of the appended claims, without departing from the spirit of the invention.

I claim as my invention:

1. A method of recovering water-soluble solid fertilizer particles of 50–5000 microns from an oil slurry containing from 20 to 40% of said water-soluble solid particles which have been pipeline transported over a great distance and at the terminal end of the pipeline recovered from the oil slurry the steps comprising:

contacting the 20 to 40% water-soluble solid particle containing oil slurry from a pipeline with a saturated brine solution under turbulent free, laminar flow conditions for a time sufficient to allow phase transfer of the water-soluble solid particles from the oil phase to the brine phase;

separating the two phases; and, recovering the water-soluble solid particles from the brine phase by settling to form a mud of said solid particles which is removed and dried.

2. The method of claim 1 wherein the water-soluble solid fertilizer particles are sylvite particles of 300–1500 microns, and the oil slurry contains from 20 to 40% of said sylvite particles.

3. The method of claim 2 wherein a hardening material is added to the sylvite.

4. The method of claim 3 wherein the hardening agent in selected from the group consisting of diammonium phosphate, ammonium phosphate, ammonium sulfate and calcium phosphate.

References Cited

UNITED STATES PATENTS

| 2,140,574 | 12/1938 | Cerf | 208—284 X |
| 2,446,040 | 7/1948 | Blair | 208—298 X |
| 3,378,363 | 4/1968 | Titus | 23—300 X |

MICHAEL E. ROGERS, Primary Examiner

U.S. Cl. X.R.

23—312; 71—64; 210—21